United States Patent Office 2,798,859
Patented July 9, 1957

2,798,859
COMPOSITIONS COMPRISING MAGNESIUM OXIDE AND ELASTOMERIC ISOCYANATE-MODIFIED LINEAR POLYESTERS

William L. Bruce, Norrkoping, Sweden, assignor, by mesne assignments, to The Goodyear Tire & Rubber Company, a corporation of Ohio No Drawing. Application January 27, 1953,
Serial No. 333,611

6 Claims. (Cl. 260—40)

This invention relates to synthetic elastomeric polymers. More particularly it relates to elastomeric diisocyanate-modified linear polyesters and polyesteramides. Still more particularly it relates to synthetic elastomers prepared from diisocyanate-modified linear polyesters and polyesteramides in which the amount of isocyanate required to effect a cross-linking or cure of the modified polyester or polyesteramide is held to a minimum. The synthetic elastomeric polymers to which this invention relates are those described in co-pending applications Serial Numbers 187,696, filed September 29, 1950, now United States Patent 2,625,532; 305,914, filed August 22, 1952; 307,900, filed September 4, 1952, and 312,161, filed September 29, 1952, now United States Patent 2,625,535. These materials, which are described in detail below, will hereinafter be referred to as elastomeric diisocyanate-modified linear polyesters.

As described in the co-pending applications referred to above, the elastomeric diisocyanate-modified linear polyesters are formed by reacting the polyesters and polyesteramides of specified molecular weight and chemical structure with controlled amounts of certain specific diisocyanates. The reaction product so formed is an uncured material similar to unvulcanized natural rubber in its physical characteristics. After compounding, the uncured material is mixed with an additional controlled amount of polyisocyanate which acts as a cross-linking or curing agent for the modified, linear polyester.

It is with this second incremental addition of polyisocyanate that this invention is concerned. It is an object of the invention to provide a means for reducing the amount of polyisocyanate required to effect a satisfactory cure of the elastomeric diisocyanate-modified polyesters. It is a further object of this invention to improve the cured physical properties of the synthetic elastomers while at the same time reducing the amount of polyisocyanate required to effect such cure. Another object of this invention is to reduce the cost of the cured elastomer without reducing its quality. Other objects will appear as the description proceeds.

It has been stated in the co-pending applications referred to above that, in order to develop a satisfactory cure, it is necessary to add sufficient polyisocyanate to the uncured modified polyester or polyesteramide to bring the total number of isocyanate equivalents present in the curable mixture to a minimum of from 2.80 to 3.20 equivalents per mol of polyester or polyesteramide. It has now been discovered that it is possible to reduce the amount of polyisocyanate required to effect a satisfactory cure, without impairing the physical properties of the cured material, by the use of magnesium oxide.

By the use of magnesium oxide in the compounding of the uncured polymer, it is possible to reduce the amount of polyisocyanate required to effect a cure so that the total number of isocyanate equivalents in the curable mixture is a minimum of from 2.40 to 2.80 equivalents per mol of polyester or polyesteramide as compared with a minimum of 2.80 to 3.20 equivalents without magnesium oxide. The amount of magnesium oxide used is not critical; as little as 0.50 part or as much as 20 parts by weight per 100 parts of the synthetic elastomer may be used. A preferred range is from 1 to 10 parts by weight per 100 parts of polymer. Amounts in excess of 20 parts may be used, but no increased beneficial effect is realized by the use of such amounts of magnesium oxide.

While each class of elastomeric diisocyanate-modified linear polyesters to which this invention is applicable has been fully described in the applications referred to above, the general chemical reactions involved in their preparation may be typically represented by the following illustrations in which R, R', and R" denote divalent organic radicals.

PREPARATION OF POLYESTER (1)

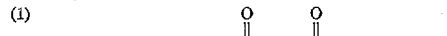
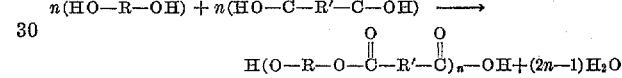

in which $n$ is a positive whole number denoting the degree of polymerization of the polyester formed.

PREPARATION OF POLYESTERAMIDE (2)

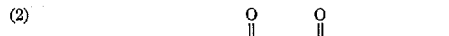
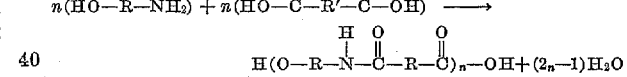

PREPARATION OF DIISOCYANATE-MODIFIED POLYESTER (3)

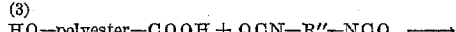
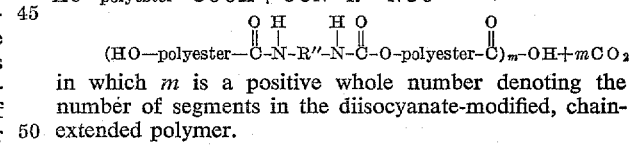

in which $m$ is a positive whole number denoting the number of segments in the diisocyanate-modified, chain-extended polymer.

PREPARATION OF DIISOCYANATE-MODIFIED POLYESTERAMIDE (4)

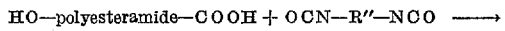
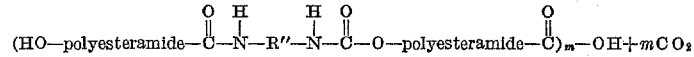

in which $m$ is a positive whole number denoting the number of segments in the diisocyanate-modified, chain-extended polymer.

PREPARATION OF DIISOCYANATE-MODIFIED INTERPOLYMERS (5)

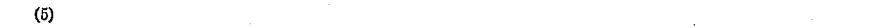
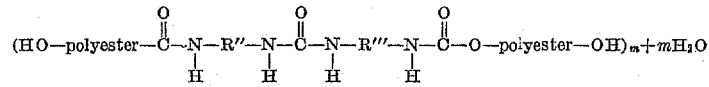

(6)

HO—polyester—COOH + H₂N—R″—OH + OCN—R‴—NCO ⟶

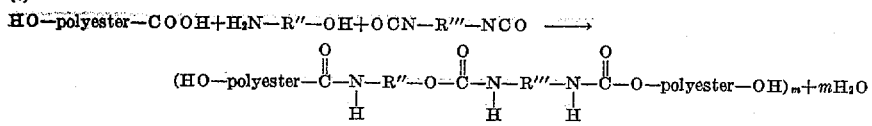

(7)

HO—polyester—COOH + H₂N—R″—COOH + OCN—R‴—NCO ⟶

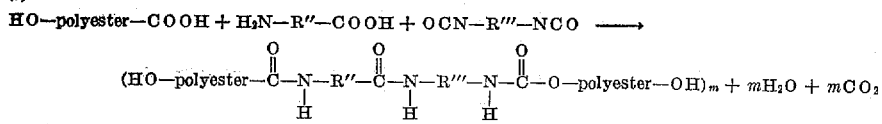

in which R″ and R‴ represent divalent organic radicals and $m$ represents a positive whole number denoting the number of segments in the modified chain-extended interpolymer.

Equations 3, 4, 5, 6 and 7 represent the reactions which may take place in forming the uncured elastomeric polymers according to the limitations as to acid number, hydroxyl number, amino groups, bifunctional additives, and amount of particular diisocyanate used in their preparation, described in the co-pending applications referred to above.

The curing or cross-linking of the uncured polymers takes place as the result of reaction between the —NCO groups in the curing agent and the reactive hydrogens in certain groups present in the chain of the extended polymer and certain terminal groups at the ends of the chain-extended units. The terminal groups include, of course, hydroxyl, carboxyl, and amino radicals. The groups along the chain include the groups formed by reaction between an —NCO group and a carboxyl, hydroxyl, or amino group, and may be represented as a substituted amide linkage

a carbamic radical

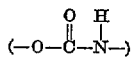

and a ureylene radical

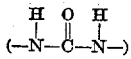

respectively. Each of these groupings has at least one active hydrogen available for reaction with the —NCO group of the polyisocyanate used to effect a cure.

The elastomeric diisocyanate-modified linear polyesters described in the co-pending applications referred to above may be grouped in four general classes.

First, the reaction product of (1) a polyester or polyesteramide prepared from at least one dibasic carboxylic acid and at least one glycol, and/or at least one amino alcohol, and/or at least one diamine; the number of hydrogen-bearing amino groups being present in an amount not to exceed 7.5% of the total hydroxyl and hydrogen-bearing amino groups present, the polyester or polyesteramide having a hydroxyl number from 40 to 100 (a preferred range is from 50 to 60) and an acid number from 0 to 7; and (2) at least one diisocyanate selected from the group consisting of 4,4′-diphenyl diisocyanate; 4,4′-diphenylene methane diisocyanate; dianisidine diisocyanate; 4,4′-tolidine diisocyanate; 1,5-naphthalene diisocyanate; 4,4′-diphenyl ether diisocyanate; and p-phenylene diisocyanate, the diisocyanate being used in an amount ranging from 0.70 to 0.99 (a preferred range is from 0.90 to 0.99) mol per mol of polyester or polyesteramide.

Second, the reaction product of (1) a polyester or polyesteramide prepared from at least one dibasic carboxylic acid, and at least one glycol, and/or at least one amino alcohol and/or at least one diamine, the number of hydrogen-bearing amino groups present being in an amount not to exceed 30% of the total hydroxyl and hydrogen-bearing amino groups present, the polyester or polyesteramide having a hydroxyl number from 30 to 140 (a preferred range is from 50 to 60) and an acid number from 0 to 12; and (2) at least one tolylene diisocyanate used in an amount ranging from 0.85 to 1.10 (a preferred range is from 0.90 to 1.00) mol per mol of polyester or polyesteramide.

Third, the reaction product resulting from the reaction of a mixture comprising (1) a polyester prepared from bifunctional ingredients including at least one dibasic carboxylic acid containing at least three carbon atoms, and at least one glycol, said polyester having a hydroxyl number from 30 to 140 ( a preferred range is from 50 to 60) and an acid number from 0 to 12; (2) at least one bifunctional additive selected from the group consisting of diamines, amino alcohols, dicarboxylic acids, amino carboxylic acids, hydroxy carboxylic acids and the ureas, guanidines and thioureas containing a primary amino group, said bifunctional additive being used in an amount such that the total number of —NH₂ and —COOH equivalents present in said bifunctional reactant shall be from 0.06 to 0.24 equivalent per mol of polyester, and (3) at least one tolylene diisocyanate used in an amount equal to the sum of from 0.85 mol to 1.10 (a preferred range is from 0.90 to 1.00) mol of diisocyanate per mol of polyester plus the molar amount of diisocyanate equivalent to the mols of said bifunctional additive used.

Fourth, the reaction product resulting from the reaction of a mixture comprising (1) a polyester prepared from bifunctional ingredients including at least one dibasic carboxylic acid containing at least three carbon atoms and at least one glycol, said polyester having a hydroxyl number between 40 and 100 (a preferred range is from 50 to 60) and an acid number from 0 to 7; (2) at least one bifunctional additive selected from the group consisting of diamines, amino alcohols, dicarboxylic acids, amino carboxylic acids, hydroxy carboxylic acids and the ureas, guanidines and thioureas containing a primary amino group, said bifunctional additive being used in an amount such that the total number of —NH₂ and —COOH equivalents present in such bifunctional reactant shall be from 0.06 to 0.48 equivalent per mol of polyester, and (3) at least one diisocyanate selected from the group consisting of 4,4′-diphenyl diisocyanate; 4,4′-diphenylene methane diisocyanate; 4,4′-tolidine diisocyanate; dianisidine diisocyanate; 1,5-naphthalene diisocyanate; 4,4′-diphenyl ether diisocyanate; and p-phenylene diisocyanate, the diisocyanate being used in an amount equal to the sum of from 0.70 mol to 0.99 (a preferred range is from 0.90 to 0.99) mol of diisocyanate per mol of polyester plus the molar amount of diisocyanate equivalent to the mols of bifunctional additive used.

Listed below are the reactants used to form some preferred polyesters and polyesteramides which, when prepared and subsequently modified by a diisocyanate and, optionally, a bifunctional additive in accordance with the appropriate limitations indicated in the description of the four types of synthetic elastomers, will produce elastomeric products.

1. Ethylene glycol plus adipic acid.
2. Propylene glycol 1,2 plus adipic acid.
3. Ethylene glycol (80 mol %), propylene glycol 1,2 (20 mol percent) plus adipic acid.
4. Ethylene glycol (80 mol percent), propylene glycol, (20 mol percent) plus azelaic acid.
5. Ethylene glycol (80 mol percent), propylene glycol, 1,2 (20 mol percent) plus sebacic acid.
6. Ethylene glycol (80 mol percent), propylene glycol 1,2 (20 mol percent) plus dilinoleic acid (20 mol percent), adipic acid (80 mol percent).
7. Ethylene glycol (80 mol percent), glycerine monoethyl ether (20 mol percent) plus adipic acid.
8. Ethylene glycol (80 mol percent), butylene glycol 1,4 (20 mol percent) plus adipic acid.
9. Ethylene glycol (80 mol percent), propylene glycol 1,3 (20 mol percent) plus adipic acid.
10. Ethylene glycol (80 mol percent), pentane diol 1,5 (20 mol percent) plus adipic acid.
11. Ethylene glycol (80 mol percent), glycerine monoisopropyl ether (20 mol percent) plus adipic acid.
12. Ethylene glycol (80 mol percent), propylene glycol 1,2 (from 18 to 5 mol percent), ethanol amine (from 2 to 15 mol percent), plus adipic acid.
13. Ethylene glycol (80 mol percent), propylene glycol 1,2 (20 mol percent) plus maleic acid (from 3 to 6 mol percent), adipic acid (from 97 to 94 mol percent).
14. Ethylene glycol (80 mol percent), propylene glycol 1,2 (from 19 to 17 mol percent), piperazine (from 1 to 3 mol percent) plus adipic acid.
15. Ethylene glycol (80 mol percent), propylene glycol 1,2 (from 18 to 5 mol percent), dihydroxyethyl aniline (fro m2 to 15 mol percent) plus adipic acid.
16. Ethylene glycol (80 mol percent), diethylene glycol (20 mol percent) plus adipic acid.
17. Ethylene glycol (from 90 to 10 mol percent), propylene glycol 1,2 (from 10 to 90 mol percent) plus adipic acid.
18. Ethylene glycol (from 90 to 10 mol percent), propylene glycol 1,2 (from 10 to 90 mol percent) plus azelaic acid.

The diisocyanates which are preferred when used to form the unvulcanized modified polyesters and polyesteramides, are 4,4'-diphenyl diisocyanate; 1,5-naphthalene diisocyanate; 4,4'-diphenylene methane diisocyanate; and the meta tolylene diisocyanates such as 2,4- and 2,6-tolylene diisocyanates. If a meta tolylene diisocyanate is to be used, a convenient method of adding it is in the form of one of its dimers such as the dimer of 2,4-tolylene diisocyanate of the following formula:

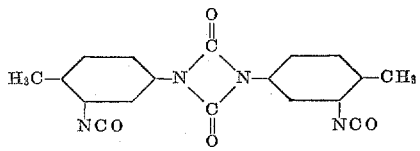

The dimer is less toxic than the monomeric material.

Of the first class of elastomeric polymers described above, those of particular interest are the rubber-like polymers resulting from polyethylene adipate modified by 4,4'-diphenyl diisocyanate; 1,5-naphthalene diisocyanate; 4,4'-diphenylene methane diisocyanate, or mixtures thereof: polypropylene 1,2 adipate modified by 4,4'-diphenyl diisocyanate; 1,5-naphthalene diisocyanate; 4,4'-diphenylene methane diisocyanate, or mixtures thereof; polyethylene (80 mol percent) propylene 1,2 (20 mol percent) adipate modified by 4,4'-diphenyl diisocyanate; 1,5-naphthalene diisocyanate; 4,4'-diphenyl methane diisocyanate, or mixtures thereof; polyethylene (80 mol percent) propylene 1,2 (20 mol percent) azelate modified by 4,4'-diphenyl diisocyanate; 1,5-naphthalene diisocyanate; 4,4'-diphenylene methane diisocyanate, or mixtures thereof; and polyethylene (80 mol percent) propylene 1,2 (from 19 to 17 mol percent) piperazine (from 1 to 3 mol percent) adipate modified by 4,4'-diphenyl diisocyanate; 1,5-naphthalene diisocyanate; 4,4'-diphenylene methane diisocyanate, or mixtures thereof. These polymers, when cured, have been found to possess outstanding physical properties.

Of the second class of elastomeric polymers described above, those of particular interest are the rubber-like polymers resulting from polyethylene adipate modified by a meta tolylene diisocyanate; polypropylene 1,2 adipate modified by a meta-tolylene diisocyanate; polyethylene (80 mol percent) propylene 1,2 (20 mol percent) adipate modified by a meta-tolylene diisocyanate; polyethylene (80 mol percent) propylene 1,2 (20 mol percent) azelate modified by a meta-tolylene diisocyanate; and polyethylene (80 mol percent) propylene 1,2 (from 19 to 17 mol percent) piperazine (from 1 to 3 mol percent) adipate modified by a meta-tolylene diisocyanate. Mixtures of meta tolylene diisocyanates such as mixtures of 2,4- and 2,6-tolylene diisocyanates may also be used.

Of the third class of elastomeric interpolymers described above, those of particular interest are the rubber-like materials resulting from (1) Polyethylene adipate modified by a meta-tolylene diisocyanate and by ethylene diamine, tetramethylene diamine, hexamethylene diamine, ethanol amine, benzidine; 4,4'-diamino diphenyl methane or mixtures thereof.

(2) Polypropylene 1,2-adipate modified by a meta-tolylene diisocyanate and by ethylene diamine, tretramethylene diamine, hexamethylene diamine, ethanol amine, benzidine; 4,4'-diamino diphenyl methane or mixtures thereof.

(3) Polyethylene (80 mol percent) propylene 1,2 (20 mol percent) adipate modified by a meta-tolylene diisocyanate and by ethylene diamine, tetramethylene diamine, hexamethylene diamine, ethanol amine, benzidine; 4,4'-diamino diphenyl methane or mixtures thereof.

(4) Polyethylene (80 mol percent) propylene 1,2 (20 mol percent) azelate modified by a meta-tolylene and by ethylene diamine, tetramethylene diamine, hexamethylene diamine, ethanol amine, benzidine; 4,4'-diamino diphenyl methane or mixtures thereof.

Mixtures of meta-tolylene diisocyanates such as mixtures of 2,4- and 2,6-tolylene diisocyanate may also be used.

Of the fourth class of elastomeric interpolymers described above, those of particular interest are the rubber-like materials resulting from (1) Polyethylene adipate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine, 4,4'-diamino diphenyl methane or mixtures thereof.

(2) Polypropylene 1,2 adipate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine, 4,4'-diamino diphenyl methane or mixtures thereof.

(3) Polyethylene (80 mol percent) propylene 1,2 (20 mol percent) adipate modified by 4,4'-diphenyl diisocyanate; 1,5-naphthalene diisocyanate; 4,4-diphenylene methane diisocyanate, or mixtures thereof, and by ethylene diamine, tretramethylene diamine, hexamethylene diamine, ethanol amine, benzidine, 4,4'-diamino diphenyl methane or mixtures thereof.

(4) Polyethylene (80 mol percent) propylene 1,2 (20 mol percent) azelate modified by 4,4'-diphenyl diisocyanate; 1,5-naphthalene diisocyanate; 4,4'-diphenylene methane diisocyanate, or mixtures thereof, and by ethylene diamine, tetramethylene diamine, hexamethylene diamine, ethanol amine, benzidine, 4,4'-diamino diphenyl methane or mixtures thereof.

The following examples, in which parts are by weight, are illustrative of the preparation of polyesters and elastomeric diisocyanate-modified polyesters.

Example 1.—Preparation of a typical polyester

Adipic acid (3515 parts) was placed in a 5 liter, 3-necked flask fitted with a stirrer, thermo-couple well, gas inlet tube, distilling head, and condenser. To the acid were added 1064 parts of ethylene glycol and 869 parts of propylene 1,2 glycol. The molar ratio of dibasic acid to glycol is 1:1.19. The mixture was heated to 130–160° C. until most of the water had distilled off. The temperature was then gradually raised to 200° C., the pressure being gradually reduced to 20 mm. and nitrogen being bubbled through the melt. After 23½ hours a soft white waxy solid was obtained. Determinations showed the acid number to be 3.5 and the hydroxyl number to be 58.6.

Example 2.—Preparation of the diisocyanate-modified polymer

A quantity of polyester was prepared from adipic acid, ethylene glycol, and propylene 1,2 glycol according to the general method and in substantially the same ratios as shown in Example 1. This polyester had an acid number of 3.1 and a hydroxyl number of 55.6. After heating 2270 parts of this polyester in a steam-heated Baker-Perkins mixer to 120° C., 4,4'-diphenyl diisocyanate (280.3 parts of 95.7% purity or 0.96 mol per mol of polyester) was added. After ten minutes of mixing the hot melt was poured into a carnauba wax coated tray and baked for 8 hours at 130° C. The resulting polymer had excellent processing characteristics on a rubber mill. Tests showed the following physical properties-intrinsic viscosity 1.69, percent gel 3.9, plastic flow (1500 p. s. i.—212° F.) 85 seconds per inch, and softening point 186° C.

Example 3.—Preparation of the diisocyanate-modified polymer

A quantity of polyester was prepared from adipic acid, ethylene glycol, and propylene, 1,2 glycol according to the general method and in substantially the same ratios as shown in Example 1. This polyester had an acid number of 3.1 and a hydroxyl number of 55.6. After heating 200 parts of this polyester to 120° C. in an iron kettle, 2,4-tolylene diisocyanate (20.11 parts of 99.7% purity or 1.10 mols of diisocyanate per mol of polyester) was added. After 15 minutes of mixing, the material was poured into a waxed aluminum tray and baked for 8 hours at 120° C. The resulting polymer had excellent processing characteristics on a rubber mill.

Example 4.—Preparation of modified interpolymer

The polyester (2270 parts) prepared according to Example 1 was placed in a steam-heated Baker-Perkins mixer, melted, and heated to 120° C. To this was added 0.12 mol of hexamethylene diamine per mol of polyester and 1.07 mols of 4,4'-diphenyl diisocyanate per mol of polyester. After ten minutes of mixing, the hot melt was poured into a carnauba wax coated tray and baked for 8 hours at 130° C. The resulting interpolymer had excellent processing characteristics on a rubber mill.

Example 5

This interpolymer was prepared in the same manner as Example 4 except adipic acid was used as a molar replacement for the hexamethylene diamine. This product, too, had good processing characteristics on a rubber mill.

Example 6

This interpolymer was prepared in the same manner as Example 4 except ethanolamine was used as a molar replacement for hexamethylene diamine. The processing characteristics of the material were good.

Example 7

This interpolymer was prepared in the same manner as Example 4 except 0.24 mol of ethanolamine per mol of polyester and 1.19 mols of 4,4'-diphenyl diisocyanate per mol of polyester were used. The reacted material possessed excellent processing characteristics on a rubber mill.

In the curing of the processible elastomers, any organic diisocyanate, polyisocyanate or mixtures of diisocyanates, of polyisocyanates, or of both may be used. It is necessary to control the amount of polyisocyanate added to effect a cure. The use of too small an amount of polyisocyanate produces an under-cured product. The use of too much polyisocyanate is a waste of material with no improved properties in the cured product and in some cases produces a cured polymer more resinous than rubber-like. Thus, without the use of magnesium oxide, it is necessary, when curing the polymers of the first and second classes, to add enough polyisocyanate to the polymer so that the total number of —NCO equivalents, including that added in the formation of the uncured polymer, shall be from 2.80 to 3.20 equivalents per mol of polyester or polyesteramide. When curing the polymers of the third and fourth classes, an additional amount of —NCO, equivalent to twice the molar amount of bifunctional additive used in preparing the interpolymer, is required.

With the use of magnesium oxide, it is possible to reduce the amount of polyisocyanate required to effect a cure to from 2.40 to 2.80 equivalents per mol of polyester or polyesteramide. This reduction of polyisocyanate results in a lower cost for the cured elastomer without materially detracting from its physical properties.

To illustrate the effect of magnesium oxide and reduced amounts of isocyanate on the cured properties of the resulting polymers, the following compounds were prepared. Parts shown are by weight.

| Recipe | 1 | 2 | 3 | 4 |
|---|---|---|---|---|
| Uncured polymer | 100.00 | 100.00 | 100.00 | 100.00 |
| Diisocyanate | 4.00 |  | 4.00 | 4.00 |
| Magnesium Oxide |  | 2.00 | 2.00 | 4.00 |

The uncured polymer employed in the above recipes was similar to that prepared according to Example 2. The diisocyanate used was 4,4'-diphenyl diisocyanate. The materials were mixed together on a mill in accordance with normal rubber mixing procedure. Test sheets were press cured 5 minutes at 280° F. The test results obtained on these cured sheets are shown in Table 1 along with an indication of the total number of —NCO equivalents used in the preparation of the cured polymer.

TABLE I

| Recipe | 1 | 2 | 3 | 4 |
|---|---|---|---|---|
| —NCO equivalents | 2.56 | 1.88 | 2.56 | 2.56 |
| Tensile strength | 2,000 | 875 | 3,000 | 3,200 |
| Elongation | 810 | 930 | 870 | 870 |
| 700% Modulus | 1,350 | 200 | 1,725 | 2,000 |
| 500% Modulus | 500 | 125 | 675 | 900 |
| 300% Modulus | 200 | 125 | 275 | 350 |

The tensile strength is expressed in pounds per square inch. The elongation is expressed in percent stretch at break. The modulus represents the pounds per square inch required to elongate the test specimen the percentage indicated.

An analysis of the test results shown in Table I will indicate that it is possible to develop superior physical properties in the cured polymers by the use of magnesium oxide even though the number of —NCO equivalents is less than 2.80 per mol of polyester instead of the 2.80 to 3.20 which is required when no magnesium oxide is present. It will be seen that recipe 1, which contains —NCO equivalents in the amount of 2.56, developed a tensile strength of 2000 pounds per square inch. By the addition of 4 parts by weight of magnesium oxide (see recipe 4), it was possible to improve the tensile to 3200 pounds per square inch. A similar improvement was obtained in recipe 3 where 2 parts of magnesium oxide were used.

Since the polyisocyanate is the most expensive ingredient of the polymer, any substantial reduction in the amount thereof used in forming the cured polymer without accompanying reduction of strength or other physical properties is of prime importance.

This application is a continuation-in-part of my copending application Serial Number 263,702, filed December 27, 1951, now abandoned.

While certain representative embodiments and details have been shown for the purpose of illustrating the invention, it will be apparent to those skilled in this art that various changes and modifications may be made therein without departing from the spirit or scope of the invention.

What is claimed is:

1. A composition of matter comprising from 0.50 to 20 parts by weight of magnesium oxide and 100 parts by weight of an elastomeric isocyanate-modified linear polyester selected from the group consisting of (A) the reaction product resulting from the reaction of a mixture comprising (1) a material prepared from bifunctional ingredients including at least one dibasic carboxylic acid and at least one complementary bifunctional reactant in which the functional groups are selected from the class consisting of the hydroxyl group and the hydrogen-bearing amino groups, the hydrogen-bearing amino groups being present in an amount not to exceed 7.5% of the total functional groups of said complementary bifunctional reactant, said material having a hydroxyl number from 40 to 100 and an acid number from 0 to 7, and (2) at least one diisocyanate selected from the group consisting of 4,4'-diphenyl diisocyanate; 4,4'-diphenylene methane diisocyanate; dianisidine diisocyanate; 4,4'-tolidine diisocyanate; 1,5-naphthalene diisocyanate; 4,4'-diphenyl ether diisocyanate, and p-phenylene diisocyanate, the diisocyanate being used in an amount ranging from 0.70 to 0.99 mol per mol of said material; (B) the reaction product resulting from the reaction of a mixture comprising (3) a material prepared from bifunctional ingredients including at least one dibasic carboxylic acid and at least one complementary bifunctional reactant in which the functional groups are selected from the class consisting of the hydroxyl group and the hydrogen-bearing amino groups, the hydrogen-bearing groups being present in an amount not to exceed 30% of the total functional groups of said complementary bifunctional reactant, said material having a hydroxyl number from 30 to 140 and an acid number from 0 to 12, and (4) at least one tolylene diisocyanate used in an amount ranging from 0.85 to 1.10 mols per mol of said material; (C) the reaction product resulting from the reaction of a mixture comprising (5) a polyester prepared from bifunctional ingredients including at least one dibasic carboxylic acid containing at least three carbon atoms, and at least one glycol, said polyester having an hydroxyl number from 30 to 140 and an acid number from 0 to 12, (6) at least one bifunctional additive selected from the group consisting of diamines, amino alcohols, dicarboxylic acids, amino carboxylic acids, hydroxy carboxylic acids and the ureas, guanidines, and thioureas containing a primary amino group, said bifunctional additive being used in an amount such that the total number of —NH$_2$ and —COOH equivalents present in said bifunctional reactant shall be from 0.06 to 0.24 equivalent per mol of polyester, and (7) at least one tolylene diisocyanate used in an amount equal to the sum of from 0.85 mol to 1.10 mols of diisocyanate per mol of polyester plus the molar amount of diisocyanate equivalent to the mols of said bifunctional additive used; (D) the reaction product resulting from the reaction of a mixture comprising (8) a polyester prepared from bifunctional ingredients including at least one dibasic carboxylic acid containing at least three carbon atoms and at least one glycol, said polyester having a hydroxyl number between 40 and 100 and an acid number from 0 to 7, (9) at least one bifunctional additive selected from the group consisting of diamines, amino alcohol, dicarboxylic acids, amino carboxylic acids, hydroxy carboxylic acids, and the ureas, guanidines and thioureas containing a primary amino group, said bifunctional additive being used in an amount such that the total number of —NH$_2$ and —COOH equivalents present in said bifunctional reactant shall be from 0.06 to 0.48 equivalent per mol of polyester, and (10) at least one diisocyanate selected from the group consisting of 4,4'-diphenyl diisocyanate; 4,4'-diphenylene methane diisocyanate; 4,4'-tolidine diisocyanate; dianisidine diisocyanate; 1,5-naphthalene diisocyanate; 4,4'-diphenyl ether diisocyanate, and p-phenylene diisocyanate, the diisocyanate being used in an amount equal to the sum of from 0.70 mol to 0.99 mol of diisocyanate per mol of polyester plus the molar amount of diisocyanate equivalent to the mols of bifunctional additive used—(A) and (B) being reacted with a sufficient amount of at least one polyisocyanate to bring the total number of —NCO equivalents present in said composition to from 2.40 to 2.80 equivalents per mol of said material and (C) and (D) being reacted with a sufficient amount of at least one polyisocyanate to bring the total number of —NCO equivalents present in said composition to the sum of from 2.40 to 2.80 equivalents per mol of said polyester plus twice the molar amount of bifunctional additive used in the preparation of said elastomeric reaction product.

2. A composition of matter comprising (1) from 0.50 to 20 parts by weight of magnesium oxide, (2) 100 parts by weight of an elastomeric isocyanate-modified linear polyester resulting from the reaction of a mixture comprising (A) a polyester prepared from at least one dibasic carboxylic acid and at least one glycol, said polyester having a hydroxyl number from 40 to 100 and an acid number from 0 to 7 and (B) 4,4'-diphenyl diisocyanate used in an amount ranging from 0.90 to 0.99 mol per mol of said polyester and (3) a sufficient amount of at least one polyisocyanate to bring the total number of —NCO equivalents present in said composition to from 2.40 to 2.80 equivalents per mol of said polyester.

3. A composition of matter comprising (1) from 0.50 to 20 parts by weight of magnesium oxide, (2) 100 parts by weight of an elastomeric isocyanate-modified linear polyester resulting from the reaction of a mixture comprising (A) a polyester prepared from at least one dibasic carboxylic acid and at least one glycol, said polyester having a hydroxyl number from 30 to 140 and an acid number from 0 to 12 and (B) tolylene diisocyanate used in an amount ranging from 0.90 to 1.00 mol per mol of said polyester and (3) a sufficient amount of at least one polyisocyanate to bring the total number of —NCO equivalents present in said composition to from 2.40 to 2.80 equivalents per mol of said polyester.

4. A composition of matter comprising (1) from 0.50 to 20 parts by weight of magnesium oxide, (2) 100 parts by weight of an elastomeric isocyanate-modified linear polyester resulting from the reaction of a mixture comprising (A) a polyester prepared from at least one dibasic carboxylic acid containing at least three carbon atoms and at least one glycol, said polyester having a hydroxyl number from 30 to 140 and an acid number from 0 to 12 (B) a diamine used in an amount such that the total number of —NH$_2$ equivalents is from 0.06 to 0.24 equivalent per mol of polyester and (C) tolylene diisocyanate used in an amount equal to the sum of from 0.90 to 1.00 mol per mol of polyester plus the molar amount of diisocyanate equivalent to the mols of diamine used and (3) a sufficient amount of at least one polyisocyanate to bring the total number of —NCO equivalents present in said composition to the sum of from 2.40 to 2.80 equivalents per mol of said polyester plus twice the molar amount of diamine used in the preparation of said elastomeric reaction product.

5. A composition of matter comprising (1) from 0.50 to 20 parts by weight of magnesium oxide, (2) 100 parts by weight of an elastomeric isocyanate-modified linear polyester resulting from the reaction of a mixture comprising (A) a polyester prepared from at least one dibasic carboxylic acid containing at least three carbon atoms and at least one glycol, said polyester having a hydroxyl number from 40 to 100 and an acid number from 0 to 7 (B) a diamine used in an amount such that the total number of —$NH_2$ equivalents is from 0.06 to 0.48 equivalent per mol of polyester and (C) 4,4'-diphenyl diisocyanate used in an amount equal to the sum of from 0.90 to 0.99 mol per mol of polyester plus the molar amount of diisocyanate equavalent to the mols of diamine used and (3) a sufficient amount of at least one polyisocyanate to bring the total number of —NCO equivalents present in said composition to the sum of from 2.40 to 2.80 equivalents per mol of said polyester plus twice the molar amount of diamine used in the preparation of said elastomeric reaction product.

6. A composition of matter comprising (1) from 0.50 to 20 parts by weight of magnesium oxide, (2) 100 parts by weight of an elastomeric isocyanate-modified linear polyester resulting from the reaction of a mixture comprising (A) a polyester prepared from at least one dibasic carboxylic acid containing at least three carbon atoms and at least one glycol, said polyester having a hydroxyl number from 40 to 100 and an acid number from 0 to 7 (B) a diamine used in an amount such that the total number of —$NH_2$ equivalents shall be from 0.06 to 0.48 equivalent per mol of polyester and (C) 4,4'-tolidine diisocyanate used in an amount equal to the sum of from 0.90 to 0.99 mol per mol of polyester plus the molar amount of diisocyanate equivalent to the mols of diamine used and (3) a sufficient amount of at least one polyisocyanate to bring the total number of —NCO equivalents present in said composition to the sum of from 2.40 to 2.80 equivalents per mol of said polyester plus twice the molar amount of diamine used in the preparation of said elastomeric reaction product.

References Cited in the file of this patent

UNITED STATES PATENTS 2,424,885     Buist et al. _____ July 29, 1947

OTHER REFERENCES

Bayer et al.: Rubber Chem. and Tech., October-December 1950, pages 812–835.

UNITED STATES PATENT OFFICE

CERTIFICATE OF CORRECTION

Patent No. 2,798,859                     July 9, 1957

William L. Bruce

It is hereby certified that error appears in the printed specification of the above numbered patent requiring correction and that the said Letters Patent should read as corrected below.

Columns 1 and 2, equation (5), extreme left-hand portion thereof, line 1, for "(HO-" read -- HO- --; column 6, lines 31 and 32, for "tretramethylene" read -- tetramethylene --; line 66, for "4,4-diphenylene" read -- 4,4'-diphenylene --; column 11, line 18, for "equavalent" read -- equivalent --.

Signed and sealed this 10th day of September 1957.

(SEAL)
Attest:
KARL H. AXLINE
Attesting Officer

ROBERT C. WATSON
Commissioner of Patents